(12) United States Patent
Zhang et al.

(10) Patent No.: US 9,955,549 B2
(45) Date of Patent: Apr. 24, 2018

(54) REDUNDANT POWER SUPPLY AND CONTROL FOR LIGHT FIXTURES

(71) Applicant: Cooper Technologies Company, Houston, TX (US)

(72) Inventors: Hui Zhang, Manlius, NY (US); Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/611,147

(22) Filed: Jun. 1, 2017

(65) Prior Publication Data
US 2017/0354017 A1    Dec. 7, 2017

Related U.S. Application Data

(60) Provisional application No. 62/344,497, filed on Jun. 2, 2016.

(51) Int. Cl.
*H05B 37/00* (2006.01)
*H05B 37/02* (2006.01)
(Continued)

(52) U.S. Cl.
CPC ............ *H05B 37/0209* (2013.01); *H02J 3/14* (2013.01); *H02J 13/0013* (2013.01)

(58) Field of Classification Search
CPC ............ G09G 3/22; G09G 2320/0233; H05B 37/0272; H05B 41/00; H05B 41/36; H05B 33/0815; H05B 39/09; H05B 41/34; H05B 33/0803; H05B 37/02; H05B 33/0842; H05B 41/28; H05B 41/295;
(Continued)

(56) References Cited

U.S. PATENT DOCUMENTS 6,737,763 B2    5/2004  Liu et al.
9,223,333 B2 *  12/2015 Suenaga ................... G05F 3/08
(Continued)

FOREIGN PATENT DOCUMENTS

WO    9841793    9/1998

OTHER PUBLICATIONS

G. Tarakanova, International Search Report and Written Opinion issued in application PCT/US2017/035433, completion date Sep. 7, 2017, dated Sep. 21, 2017, 7 pages, Federal Institute of Industrial Property, Moscow, Russia.

*Primary Examiner* — Minh D A
(74) *Attorney, Agent, or Firm* — King & Spalding LLP

(57) ABSTRACT

An electrical system can include first and second electrical loads. The electrical system can also include a first power supply coupled to the first electrical load, where the first electrical load receives first power from the first power supply at a first time. The electrical system can further include a second power supply coupled to the second electrical load, where the second electrical load receives second power from the second power supply at the first time. The electrical system can also include a first switch disposed between and coupled to the first electrical load and the second power supply. The first switch, when in an open position at the first time, can prevent the second power from being received by the first electrical load. The first switch, when in a closed position at a second time, can allow the second power to be received by the first electrical load.

20 Claims, 8 Drawing Sheets

(51) Int. Cl.
*H02J 3/14* (2006.01)
*H02J 13/00* (2006.01)

(58) Field of Classification Search
CPC ............ H05B 41/2827; H05B 41/3925; H05B 33/0818; H05B 41/2828; H05B 41/3921; H05B 41/3927; H05B 37/029; H05B 37/0254; B61L 5/1881; F02P 1/005; F02P 15/003; G02F 1/01; B23K 9/1068; G09F 13/26; H01J 17/48; H01J 2893/007; H03K 23/82; Y02B 20/202
See application file for complete search history.

(56) References Cited

U.S. PATENT DOCUMENTS

| | | |
|---|---|---|
| 2005/0035656 A1 | 2/2005 | Kuramochi et al. |
| 2008/0164759 A1 | 7/2008 | Sharma et al. |
| 2009/0049337 A1 | 2/2009 | Hsieh et al. |

* cited by examiner

REDUNDANT POWER SUPPLY AND CONTROL FOR LIGHT FIXTURES

CROSS-REFERENCE TO RELATED APPLICATIONS

This application claims priority under 35 U.S.C. § 119 to U.S. Provisional Patent Application Ser. No. 62/344,497, titled "Redundant Power Supply and Control For Light Fixtures" and filed on Jun. 2, 2016, the entire contents of which are hereby incorporated herein by reference.

TECHNICAL FIELD

The present disclosure relates generally to power supplies for light fixtures, and more particularly to systems, methods, and devices for redundant power supply and control for light fixtures.

BACKGROUND

Light fixtures are used in a variety of environments. Many of these light fixtures use advanced technology with a number of components. As a result, these light fixtures can have a number of failure points. In certain lighting applications, such as lighting systems used in hazardous environments, reliability of the lighting system is vital. Unfortunately, the characteristics (e.g., humidity, extreme temperatures, corrosive gas) of these environments can cause the failure of one or more components of a light fixture to be accelerated.

SUMMARY

In general, in one aspect, the disclosure relates to an electrical system that can include a first electrical load and a second electrical load. The electrical system can also include a first power supply coupled to the first electrical load, where the first electrical load receives a first power from the first power supply at a first time. The electrical system can further include a second power supply coupled to the second electrical load, where the second electrical load receives a second power from the second power supply at the first time. The electrical system can also include a first switch disposed between and coupled to the first electrical load and the second power supply, where the first switch has an open position and a closed position. The first switch, when in the open position at the first time, can prevent the second power from being received by the first electrical load. The first switch, when in the closed position at a second time, can allow the second power to be received by the first electrical load.

In another aspect, the disclosure can generally relate to a switching system for an electrical system. The switching system can include a first switch electrically coupled to a first electrical load, a first power supply, and a second power supply of the electrical system, where the first switch has a first position and a second position. The switching system can also include a controller that operates the first switch between the first position and the second position. The first switch, when in the first position, can allow a first power to flow from the first power supply to the first electrical load and prevent a second power from flowing from the second power supply to the first electrical load. The first switch, when in the second position, can allow the second power to flow from the second power supply to the first electrical load.

In yet another aspect, the disclosure can generally relate to a method for providing power to a lighting system. The method can include operating, using a controller at a first time, a switch to a first position, wherein the switch is electrically coupled to a first power supply, a second power supply, and a first lighting load, where first power from the first power supply flows to the first lighting load when the switch is in the first position, and where second power from the second power supply is prevented from flowing to the first lighting load when the switch is in the first position. The method can also include operating, using the controller at a second time, the switch to a second position, where the first power from the first power supply is prevented from flowing to the first lighting load when the switch is in the second position, and where the second power from the second power supply flows to the first lighting load when the switch is in the second position.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1A:
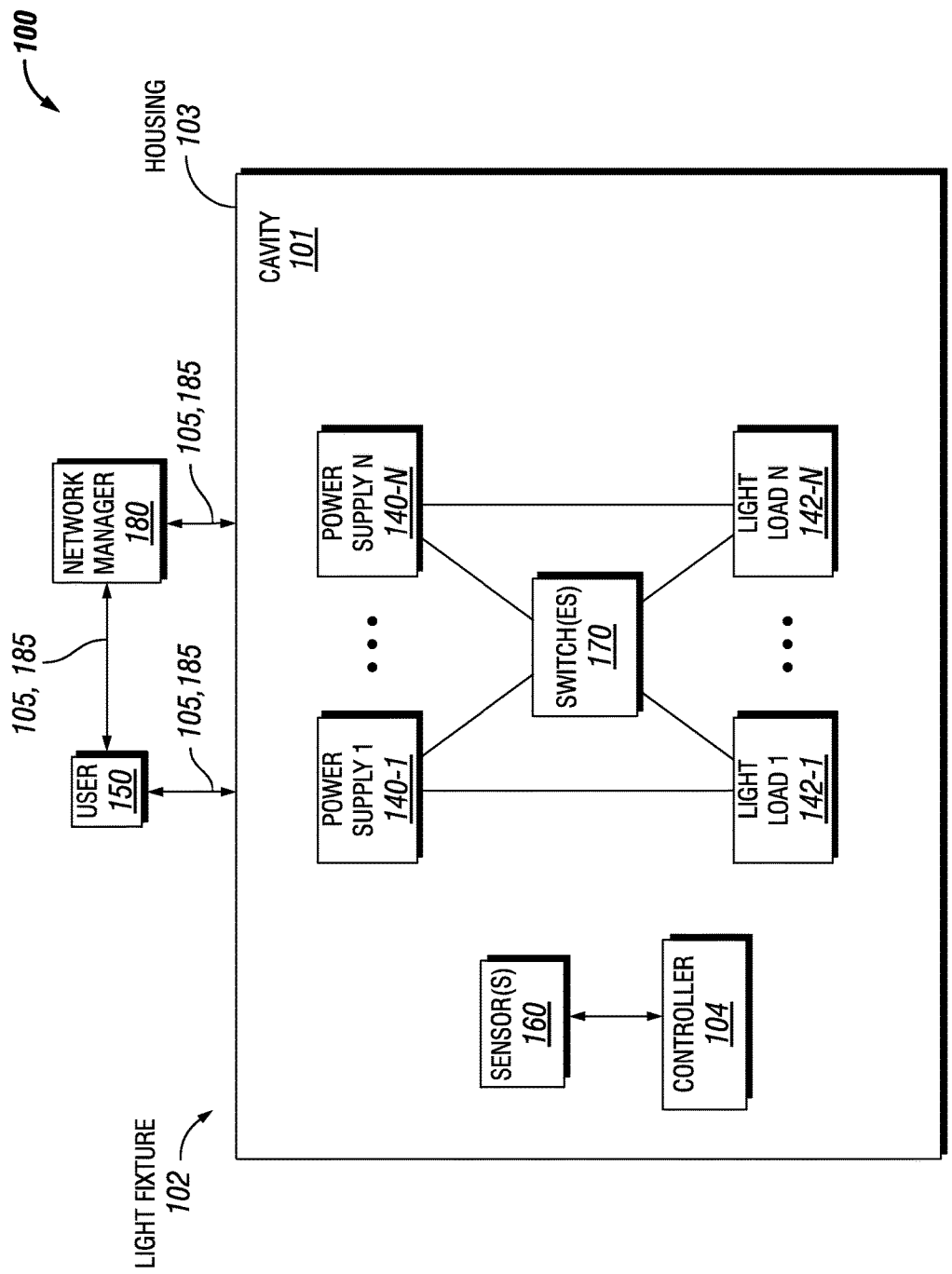
FIGS. 1A and 1B show a system diagram of a lighting system that includes a light fixture in accordance with certain example embodiments.

In general, example embodiments provide systems, methods, and devices for redundant power supply and control for light fixtures. Example redundant power supplies and controls for light fixtures provide a number of benefits. Such benefits can include, but are not limited to, preventing abrupt failure of light fixtures in critical applications, longer useful life of light fixtures (and power supplies in particular), enabling preventative maintenance practices, more consistent light output of light fixtures, reducing operating costs, and compliance with industry standards that apply to light fixtures located in certain environments.

While example embodiments are directed to LED drivers, any type of power supply for a light fixture can be utilized in example embodiments. An example of another power supply can include, but is not limited to, a ballast. Further, while example embodiments are directed herein to lighting loads that use light-emitting diode (LED) technology, example embodiments can also be directed to other types of lighting technology. Examples of such other lighting technologies can include, but are not limited to, fluorescent, sodium vapor, halogen, incandescent, and mercury vapor. When example embodiments are directed to LED technology, one or more of any type of LED technology can be included, such as chip-on-board, discrete, arrays, and multicolor.

More generally, while example embodiments are described herein as being used for light fixtures, example embodiments can also be used for any of a number of other electrical loads. Such other electrical loads can include, but are not limited to, computers (for a computer system), sensors (as an example, for a security system), controllers (for a control system), and elevator motors (for an elevator system). Therefore, example embodiments are not limited to use with lighting systems.

Example embodiments can be used during an adverse operating condition (e.g., a fault). In this way, one or more light loads can continue to receive power and operate during the adverse operating condition. In addition, or in the alternative, example embodiments can be used during normal operating conditions. In this way, example embodiments can be used to increase reliability and useful life of one or more power supplies that provide power to one or more light loads by cycling the power supplies based on one or more factors (e.g., an amount of time, a point in time, a number of consecutive operating hours).

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with light fixtures. Examples of a user may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative.

The example light fixtures having redundant power supply and control (or components thereof, including controllers) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures (or portions thereof) having redundant power supply and control described herein can be made from a single piece (as from a mold, injection mold, die cast, or extrusion process). In addition, or in the alternative, example light fixtures (or portions thereof) having redundant power supply and control can be made from multiple pieces that are mechanically coupled to each other. In such a case, the multiple pieces can be mechanically coupled to each other using one or more of a number of coupling methods, including but not limited to, epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of redundant power supply and control for light fixtures, one or more of the components shown may be omitted, repeated, and/or substituted. Accordingly, example embodiments of redundant power supply and control for light fixtures should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

While example embodiments described herein are directed to multiple light loads within one or more light fixtures, redundant power supply and control can also be applied to any other devices and/or components disposed within an electrical enclosure. As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a driver, a ballast), a battery, a sensor module, a safety barrier, a sensor, sensor circuitry, a light source, electrical cables, and electrical conductors. Examples of an electrical enclosure can include, but are not limited to, a housing for a light fixture, a junction box, a motor control center, a breaker box, an electrical housing, a conduit, a control panel, an indicating panel, and a control cabinet.

In certain example embodiments, light fixtures having redundant power supply and control are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

Example embodiments of redundant power supply and control for light fixtures will be described more fully hereinafter with reference to the accompanying drawings, in which example embodiments of redundant power supply and control for light fixtures are shown. Redundant power supply and control for light fixtures may, however, be embodied in many different forms and should not be construed as limited to the example embodiments set forth herein. Rather, these example embodiments are provided so that this disclosure will be thorough and complete, and will fully convey the scope of redundant power supply and control for light fixtures to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation, and are not meant to limit embodiments of redundant power supply and control for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
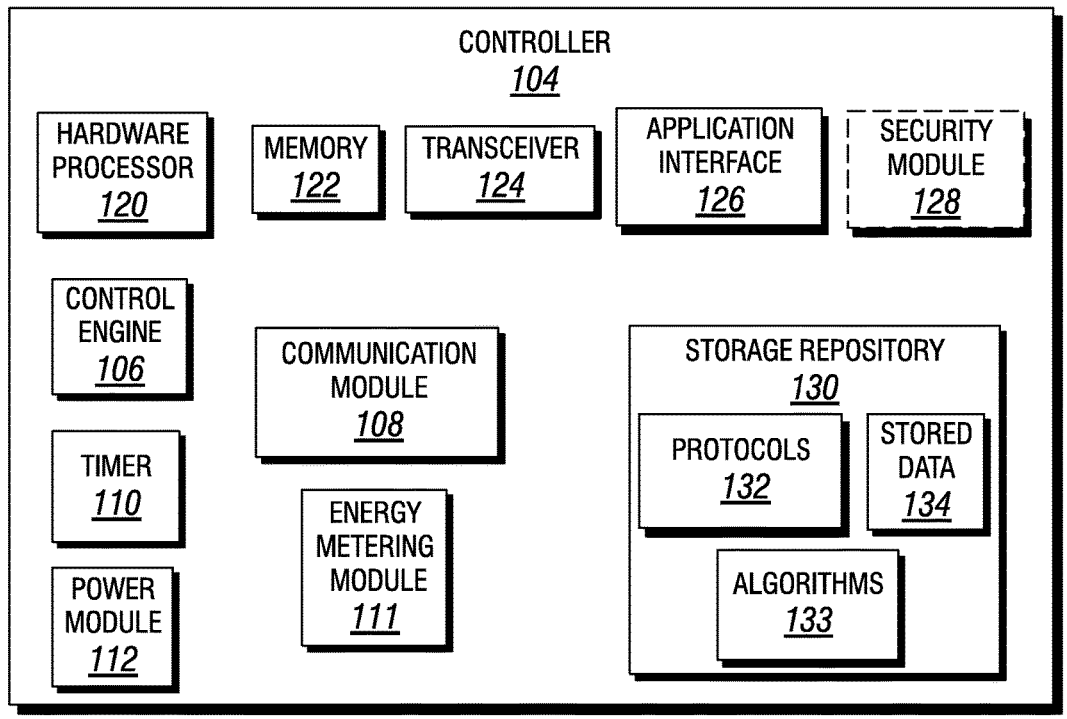

FIGS. 1A and 1B show a system diagram of a lighting system 100 that includes redundant power supply and control of a light fixture 102 in accordance with certain example embodiments. Specifically, FIG. 1A shows the lighting system 100, and FIG. 1B shows a detailed system diagram of a controller 104. As shown in FIGS. 1A and 1B, the lighting system 100 can include one or more sensors 160 (also sometimes called sensor modules 160), a user 150, a network manager 180, and at least one light fixture 102. In addition to the controller 104 and the sensors 160, the light fixture 102 can include multiple power supplies 140 (e.g., power supply 140-1, power supply 140-N), one or more switches 170, and a number of light loads 142 (e.g., light load 142-1, light load 142-N). The number of power supplies 140 can be the same as, or different than, the number of light loads 142.

As shown in FIG. 1B, the controller 104 can include one or more of a number of components. Such components, can include, but are not limited to, a control engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example light fixture. Any component of the example light fixture 102 can be discrete or combined with one or more other components of the light fixture 102.

The user 150 is the same as a user defined above. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensors 160. Interaction between the user 150 and the light fixture 102, the network manager 180, and the sensors 160 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a signal transfer link 105 can be (or include) one or more electrical conductors that are coupled to the housing 103 of the light fixture 102 and to a sensor 160. A signal transfer link 105 can transmit signals (e.g., communication signals, control signals, data) between the light fixture 102 and the user 150, the network manager 180, and/or one or more of the sensors 160. Similarly, a power transfer link 185 can transmit power between the light fixture 102 and the user 150, the network manager 180, and/or one or more of the sensors 160. One or more signal transfer links and/or one or more power transfer links can also transmit signals and power, respectively, between components (e.g., controller 104, sensor 160, switch 170) within the housing 103 of the light fixture 102.

The network manager 180 is a device or component that can communicate with the light fixture 102. For example, the network manager 180 can send instructions to the controller 104 of the light fixture 102 as to when certain switches 170 should be operated (change state). As another example, the network manager 180 can receive data (e.g., run time, current flow) associated with the operation of each power supply 140 from the light fixture 102 to determine when maintenance should be performed on the light fixture 102 or portions thereof.

The one or more sensors 160 can be any type of sensing device that measure one or more parameters. Examples of types of sensors 160 can include, but are not limited to, a resistor, a Hall Effect current sensor, a thermistor, a vibration sensor, an accelerometer, a passive infrared sensor, a photocell, and a resistance temperature detector. A parameter that can be measured by a sensor 160 can include, but is not limited to, current, voltage, power, resistance, vibration, position, and temperature. In some cases, the parameter or parameters measured by a sensor 160 can be used to operate one or more light loads 142 of the light fixture 102. Each sensor 160 can use one or more of a number of communication protocols. A sensor 160 can be associated with the light fixture 102 or another light fixture in the system 100. A sensor 160 can be located within the housing 103 of the light fixture 102 (as shown in FIG. 1A), disposed on the housing 103 of the light fixture 102, or located outside the housing 103 of the light fixture 102.

The user 150, the network manager 180, and/or the sensors 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, and/or each sensor 160. The user 150, the network manager 180, and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

The housing 103 of the light fixture 102 can be used to house one or more components of the light fixture 102, including one or more components of the controller 104. For example, as shown in FIGS. 1A and 1B, the controller 104 (which in this case includes the control engine 106, the communication module 108, the timer 110, the energy metering module 111, the power module 112, the storage repository 130, the hardware processor 120, the memory 122, the transceiver 124, the application interface 126, and the optional security module 128), the power supply 140, and the light loads 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more sensors 160 within the system 100. In one or more example embodiments, the storage repository 130 stores one or more protocols 132, algorithms 133, and stored data 134. The protocols 132 can be any procedures (e.g., a series of method steps) and/or other similar operational procedures that the control engine 106 of the controller 104 follows based on certain conditions at a point in time.

The protocols 132 can include any of a number of communication protocols 132 that are used to send and/or receive data between the controller 104 and one or more components within (e.g., between the controller 104 and the user 150, the network manager 180, and one or more sensors 160) and/or outside the system 100. For example, one or more protocols 132 can be a process or procedure by which the controller 104 (or portions thereof) operates under a given set of conditions (e.g., time, readings by sensors 160, measurements by energy metering module 111). One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any formulas, logic steps, mathematical models, and/or other suitable means of manipulating and/or processing data used by the control engine 106 of the controller 104 based on certain conditions at a point in time. One or more algorithms 133 are often used in conjunction with one or more protocols 132. An example of an algorithm 133 combined with a protocol 132 is measuring (using the energy metering module 111), storing (using the stored data 134 in the storage repository 130), and evaluating the current and voltage delivered to and delivered by a particular power supply 140 (e.g., power supply 140-1) to one or more particular light loads 142 over time.

As another example, an algorithm 133 combined with a protocol 132 can be directed to continuously monitoring the current (as measured by the energy metering module 111 and stored as stored data 134) output by a power supply 140 (e.g., power supply 140-1). As another example, an algorithm 133 combined with a protocol 132 can be directed to analyzing the current output of a power supply 140 over time. If the current output exceeds a threshold value, then one or more switches 170 can change state (by the control engine 106) to change the current output of the power supply 140.

Stored data 134 can be any data associated with the light fixture 102 (including other light fixtures and/or any components thereof), any measurements taken by the sensors 160, measurements taken by the energy metering module 111, time measured by the timer 110, threshold values, current ratings for each power supply 140, results of previously run or calculated algorithms, and/or any other suitable data. Such data can be any type of data, including but not limited to historical data for the light fixture 102 (including any components thereof, such as the power supplies 140 and the light loads 142), historical data for other light fixtures, calculations, measurements taken by the energy metering module 111, and measurements taken by one or more sensors 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, and the sensors 160 in the system 100. More specifically, the control engine 106 sends information to and/or receives information from the storage repository 130 in order to communicate with the user 150, the network manager 180, and the sensors 160. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor 160, the user 150) in the system 100.

As another example, the control engine 106 can acquire the current time using the timer 110. The timer 110 can enable the controller 104 to control the light fixture 102 (including any components thereof, such as one or more power supplies 140 and one or more switches 170) even when the controller 104 has no communication with the network manager 180. As yet another example, the control engine 106 can direct the energy metering module 111 to measure and send power consumption information of a power supply 140 to the network manager 180. In some cases, the control engine 106 of the controller 104 can control the position (e.g., open, closed) of each switch 170, which causes a particular power supply 140 to provide power to any of a number (e.g., zero, one, five) of particular light loads 142.

The control engine 106 can be configured to perform a number of functions that control which power supplies 140 of a light fixture 102 provide power to each light load 142 of the light fixture 102. Specifically, the control engine 106 can control the position of each of the switches 170, thereby controlling which power supply 140 provides power to each light load 142.

For example, the control engine 106 can execute any of the algorithms 133 stored in the storage repository 130 and use the results of those algorithms 133 to change the position of one or more switches 170. As a specific example, the control engine 106 can measure (using the energy metering module 111), store (as stored data 134 in the storage repository 130), and evaluate, using an algorithm 133, the current and voltage delivered by each power supply 140 to light loads 142 over time. In this way, the operation of each power supply 140 can be optimized to increase the reliability of the power supplies 140. As another specific example, the control engine 106 can determine, based on measurements made by the energy metering module 111, whether a particular power supply 140 has failed. In such a case, the control engine 106 can change the position of one or more switches 170 to have another power supply 140 provide power to the one or more light loads 142 that were receiving power from the power supply 140 that failed.

The control engine 106 can generate an alarm when an operating parameter (e.g., total number of operating hours, number of consecutive operating hours, number of operating hours delivering power above a current level, input power quality, vibration, operating ambient temperature, operating device temperature, and cleanliness (e.g., air quality, fixture cleanliness)) of a power supply 140 exceeds a threshold value, indicating possible present or future failure of the power supply 140. The control engine 106 can further measure (using one or more sensors 160) and analyze the magnitude and number of surges that the power supply 140 is subjected to over time. Using one or more algorithms 133, the control engine 106 can predict the expected useful life of a particular power supply 140 based on stored data 134 and/or one or more threshold values. The control engine 106 can also measure (using one or more sensors 160) and analyze the efficiency of a power supply 140 over time. An alarm can be generated by the control engine 106 when the efficiency of a power supply 140 falls below a threshold value, indicating failure of the power supply 140.

The control engine 106 can provide power, control, communication, and/or other similar signals to the user 150, the network manager 180, and one or more of the sensors 160. Similarly, the control engine 106 can receive power, control, communication, and/or other similar signals from the user 150, the network manager 180, and one or more of the sensors 160. The control engine 106 can control each sensor 160 automatically (for example, based on one or more algorithms stored in the control engine 106) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components of a system external to the system 100 in furtherance of optimizing the performance of the power supplies 140 of the light fixture 102. For example, the control engine 106 can interact with an inventory management system by ordering a power supply to replace a power supply 140 of the light fixture 102 that the control engine 106 has determined to fail or be failing. As another example, the control engine 106 can interact with a workforce scheduling system by scheduling a maintenance crew to repair or replace a power supply 140 of the light fixture 102 when the control engine 106 determines that the power supply 140 requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a power supply 140, a switch 170) of the light fixture 102. For example, if a power supply 140 of the light fixture 102 operates under IEC Standard 62386, then the power supply 140 can have a serial communication interface that will transfer data (e.g., stored data 134) measured by the sensors 160. In such a case, the control engine 106 can also include a serial interface to enable communication with a power supply 140 within the light fixture 102. Such an interface can operate in conjunction with, or independently of, the communication protocols 132 used to communicate between the controller 104 and the user 150, the network manager 180, and the sensors 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, and/or one or more of the sensors 160. In some cases, the communication module 108 accesses the stored data 134 to determine which communication protocol is used to communicate with the sensor 160 associated with the stored data 134. In addition, the communication module 108 can interpret the communication protocol of a communication received by the controller 104 so that the control engine 106 can interpret the communication.

The communication module 108 can send and receive data between the network manager 180, the sensors 160, and/or the users 150 and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensors 160 and the network manager 180 or a user 150 by converting the data into a format understood by the communication module 108.

The communication module 108 can send data (e.g., communication protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points (e.g., output of each power supply 140) associated with the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor.

The power module 112 of the controller 104 provides power to one or more other components (e.g., timer 110, control engine 106) of the controller 104. In addition, in certain example embodiments, the power module 112 can provide power to one or more power supplies 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from a source external to the light fixture 102 and generates power of a type (e.g., alternating current (AC), direct current (DC)) and level (e.g., 12V, 24V, 120V) that can be used by the other components of the controller 104 and/or by one or more power supplies 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or one or more power supplies 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensors 160. In such a case, the control engine 106 can direct the power generated by the power module 112 to the sensors 160 and/or one or more power supplies 140 of the light fixture 102. In this way, power can be conserved by sending power to the sensors 160 and/or one or more power supplies 140 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, and/or one or more of the sensors 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, and/or the sensors 160. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, and/or the sensors 160 can be part of the stored data 134 (or similar areas) of the storage repository 130.

Optionally, in one or more example embodiments, the security module 128 secures interactions between the controller 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the controller 104 and/or the sensors 160. Further, the security module 128 can restrict receipt of information, requests for information, and/or access to information in some example embodiments.

As mentioned above, aside from the controller 104 and its components, the light fixture 102 can include multiple power supplies 140, one or more switches 170, and one or more light loads 142. The light loads 142 of the light fixture 102 are devices and/or components typically found in a light fixture to allow the light fixture 102 to operate. The light fixture 102 can have one or more of any number and/or type of light loads 142. Examples of such light loads 142 can include, but are not limited to, a local control module, a light load, a light engine, a heat sink, an electrical conductor or electrical cable, a light array, a terminal block, a lens, a diffuser, a reflector, an air moving device, a baffle, a dimmer, and a circuit board. A light load 142 can use any type of lighting technology, including but not limited to LED, incandescent, sodium vapor, and fluorescent.

Each power supply 140 of the light fixture 102 provides power to one or more of the light loads 142. A power supply 140 can be called by any of a number of other names, including but not limited to a driver, a LED driver, and a ballast. A power supply 140 can be substantially the same as, or different than, the power module 112 of the controller 104. Each power supply 140 can include one or more of a number of single or multiple discrete components (e.g., transistor, diode, resistor), and/or a microprocessor. A power supply 140 may include a printed circuit board, upon which the microprocessor and/or one or more discrete components are positioned, and/or a dimmer. A power supply 140 can be configured the same as, or differently relative to, one or more of the other power supplies 140 of the light fixture 102.

A power supply 140 can include one or more components (e.g., a transformer, a diode bridge, an inverter, a converter) that receives power (for example, through an electrical cable) from the power module 112 of the controller 104 and generates power of a type (e.g., AC, DC) and level (e.g., 12V, 24V, 120V) that can be used by one or more of the light loads 142. In addition, or in the alternative, a power supply 140 can receive power from a source external to the light fixture 102. In addition, or in the alternative, a power supply 140 can be a source of power in itself. For example, a power supply 140 can be a battery, a localized photovoltaic power system, or some other source of independent power.

In certain example embodiments, one or more of the power supplies 140 are part of a multi-module power supply (not shown). In such a case, the multi-module power supply can have a housing inside of which are disposed one or more of the power supplies 140. In such a case, each power supply 140 in the multi-module power supply can be individually replaceable without having to replace the entire multi-module power supply. In addition, or in the alternative, one or more of the power supplies 140 can be a stand-alone device. A power supply 140 can have one or more output channels, where each output channel is coupled to one or more light loads 142 to provide power to such one or more light loads 142. Similarly, a power supply 140 can have one or more input channels, where each input channel is coupled to one or more sources of power (e.g., power module 112) to receive power from such one or more sources of power.

A power supply 140 can be sized for a particular load. In other words, a power supply 140 can be designed to a maximum amount of power to one or more light loads 142. Using example embodiments, a power supply 140 may be oversized relative to a power supply currently used in the art. As an example, each power supply 140 in an example light fixture 102 can be oversized to provide power to four different light loads 142 at the same time. The controller 104 can then alternate from one power supply 140 to another based on some parameter (e.g., a period of time). In this way, each power supply 140 can operate only about 25% of the time, and when the power supply 140 operates, it runs at substantially full output.

As shown in FIG. 1A, each power supply 140 can be coupled to multiple light loads 142. The switches 170 determine which power supplies 140 are coupled to which light loads 142 at any particular point in time. A switch 170 has an open state and a closed state. In the open state, the switch 170 creates an open circuit, which prevents a power supply 140 from delivering power to a light load 142. In the closed state, the switch 170 creates a closed circuit, which allows a power supply 140 to deliver power to a light load 142. In certain example embodiments, the position of each switch is controlled by the control engine 106 of the controller 104.

Each switch 170 can be any type of device that changes state or position (e.g., opens, closes) based on certain conditions. Examples of a switch can include, but are not limited to, a transistor, a dipole switch, a relay contact, a resistor, and a NOR gate. In certain example embodiments, each switch 170 can operate (e.g., change from a closed position to an open position, change from an open position to a closed position) based on input from the controller 104.

As stated above, the light fixture 102 can be placed in any of a number of environments. In such a case, the housing 102 of the light fixture 102 can be configured to comply with applicable standards for any of a number of environments. For example, the light fixture 102 can be rated as a Division 1 or a Division 2 enclosure under NEC standards. Similarly, any of the sensors 160 or other devices communicably coupled to the light fixture 102 can be configured to comply with applicable standards for any of a number of environments. For example, a sensor 160 can be rated as a Division 1 or a Division 2 enclosure under NEC standards.

Figure 2:
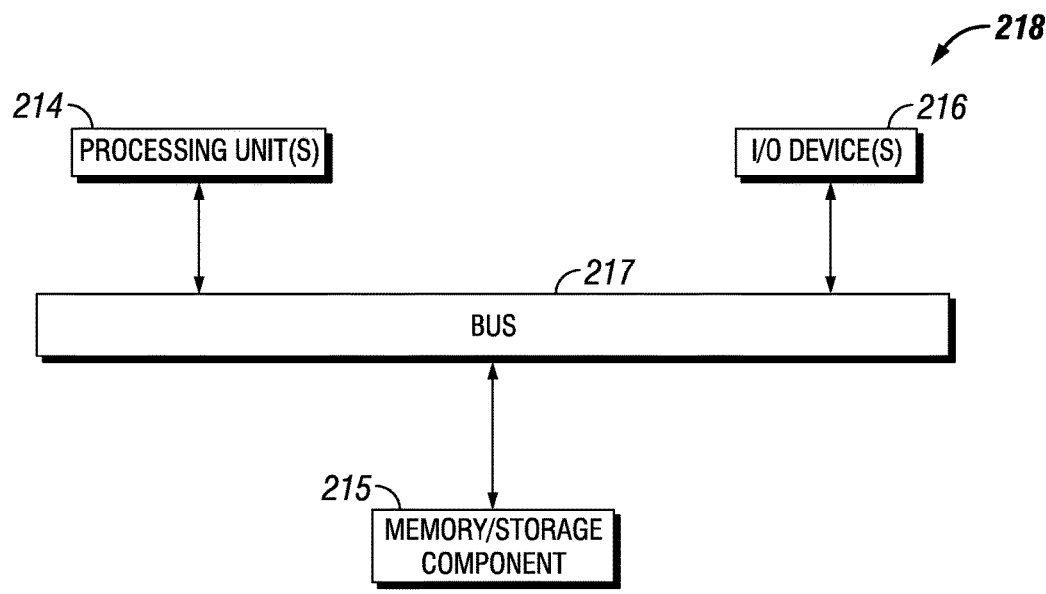
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3A:
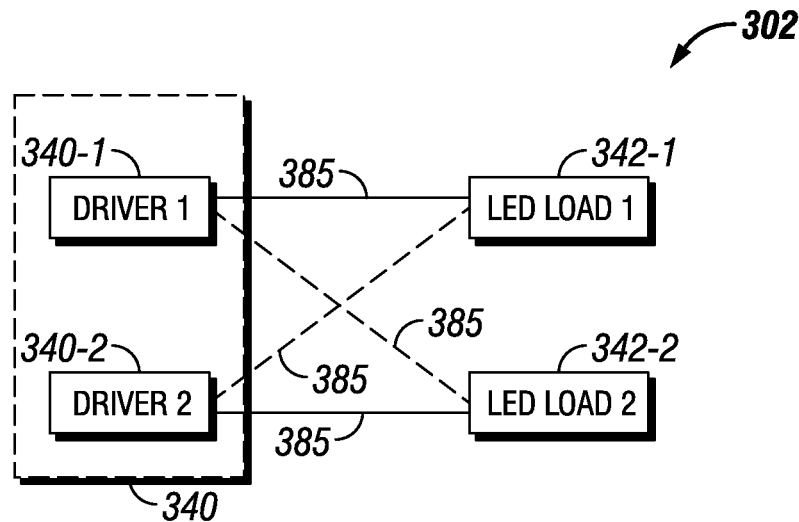
FIGS. 3A and 3B show a single line diagram and a schematic diagram, respectively, of a light fixture in accordance with certain example embodiments.
Figure 3B:
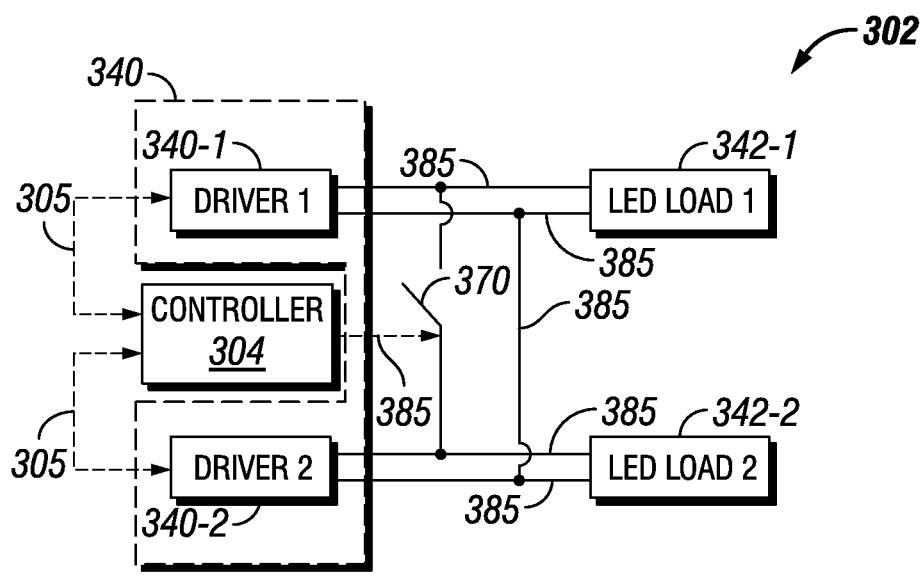

FIGS. 3A and 3B show a single line diagram and a schematic diagram, respectively, of a light fixture 302 in accordance with certain example embodiments. In this case, the light fixture 302 includes a multi-module power supply 340 that includes two power supplies (power supply 340-1 and power supply 340-2). The light fixture 302 also includes two light loads 342 (light load 342-1 and light load 342-2), a controller 304, a switch 370, a number of power transfer links 385 that provide power from the multi-module power supply 340 to the light loads 342 (in some cases through the switch 370), and a number of signal transfer links 305 that provide signal (e.g., control) communication between the multi-module power supply 340 and the controller 304, and between the controller 304 and the switch 370.

Specifically, in this example, there are power transfer links 385 for both the positive and negative legs of the DC power provided by power supply 340-1 to light load 342-1 and by power supply 340-2 to light load 342-2. As shown in FIGS. 3A and 3B, there is also at least one power transfer link 385 that ties the two negative legs. Further, in this example, there is a power transfer link 385 that electrically couples switch 370 to the two positive legs. FIGS. 3A and 3B also show that there are signal transfer links 305 between the controller 304 and the two power supplies: power supply 340-1 and power supply 340-2. Finally, in this example, there is a signal transfer link 305 between the controller 304 and the switch 370.

As an example embodiment, a sensor (not shown) (e.g., sensor 160) is dedicated to detecting a fault for each power supply 340. When the sensor detects a fault for a particular power supply 340 (e.g., power supply 340-1), the sensor sends a signal to the controller 304 to notify the controller 304 of the fault. Upon receiving the signal from the sensor, the controller 304 sends a control signal to the switch 370 so that the inoperable power supply 340 (e.g., power supply 340-1) is isolated, and so that the corresponding light load 342 receives power from another power supply 340 (e.g., power supply 340-2).

As shown in FIG. 3B, the switch 370 is in the open position. As a result, power supply 340-1 only provides power to light load 342-1, and power supply 340-2 only provides power to light load 342-2. If there is a failure in power supply 340-1 or power supply 340-2, then the controller 304 detects the failure and changes the switch 370 from the open position to the closed position (not shown). When that occurs, both light loads 342 continue to receive power, even though one of the power supplies (e.g., power supply 340-1) has failed. In such a case, depending on the rated output of the power supply (e.g., power supply 340-2) providing power to multiple light loads 342, the light output of those light loads 342 can be at a normal level, or can be dimmed.

If a power supply 340 is operating below its rated capacity when providing power to a single light load 342, the controller 304 can increase the power output of that power supply 340 when the power supply 340 is called upon to provide power to multiple light loads 342. In such a case, the controller 304 can make such an adjustment based on one or more of a number of factors, including but not limited to the rated output of the power supply 340, the dimmability of each of the light loads 342, the amount of ambient light at that point in time, and the number of other power supplies 340 available in the system 302. In certain example embodiments, the switch 370 is part of the multi-module power supply 340 so that all of the power supplies 340 and all switches 370 are part of the same device.

Figure 4A:
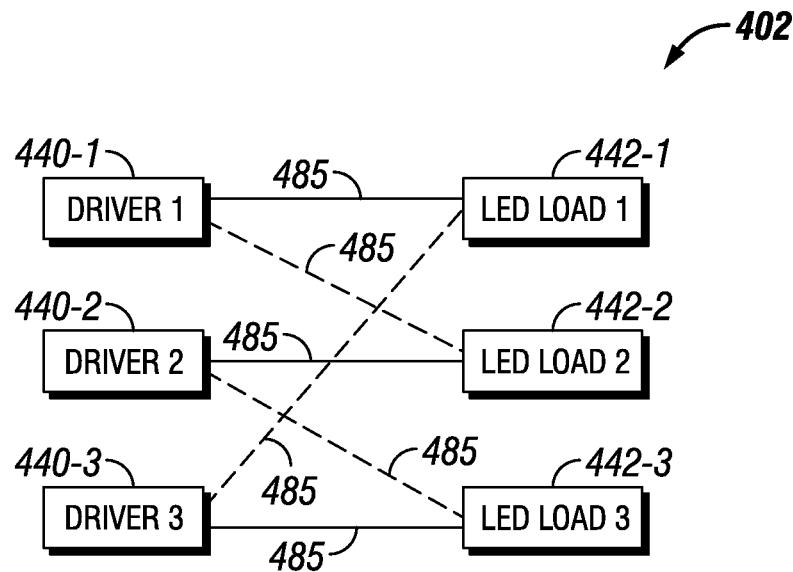
FIGS. 4A and 4B show a single line diagram and a schematic diagram, respectively, of another light fixture in accordance with certain example embodiments.
Figure 4B:
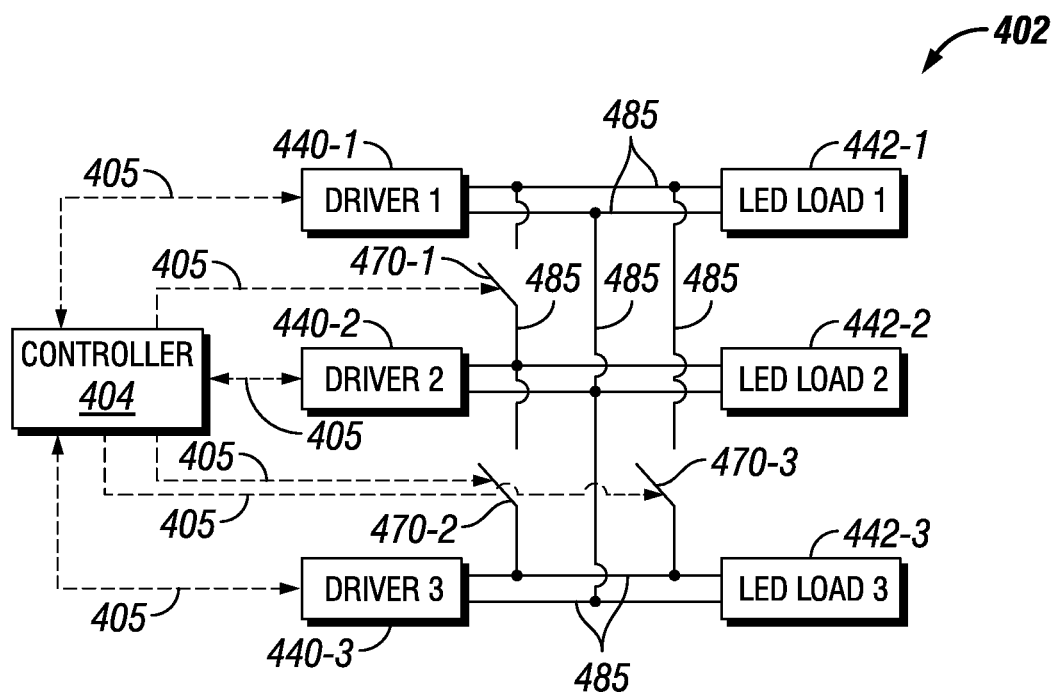

FIGS. 4A and 4B show a single line diagram and a schematic diagram, respectively, of another light fixture 402 in accordance with certain example embodiments. The light fixture 402 of FIGS. 4A and 4B is substantially similar to the light fixture 302 of FIGS. 3A and 3B, except as described below. For example, in this case, the light fixture 402 has three power supplies (power supply 440-1, power supply 440-2, and power supply 440-3) instead of two. Similarly, there are three light loads (light load 442-1, light load 442-2, and light load 442-3) in this example instead of two light loads.

Also, in this case, there is no multi-module power supply, and so power supply 440-1, power supply 440-2, and power supply 440-3 are individual components of the light fixture 402. Further, rather than each power supply 440 feeding each of the three light loads 442, each power supply 440 feeds two of the three light loads 442 using a number of power transfer links 485. Specifically, in this case, power supply 440-1 is the primary source of power for light load 442-1 and the secondary source of power for light load 442-2; power supply 440-2 is the primary source of power for light load 442-2 and the secondary source of power for light load 442-3; and power supply 440-3 is the primary source of power for light load 442-3 and the secondary source of power for light load 442-1.

Finally, instead of a single switch, there are three switches 470 (switch 470-1, switch 470-2, and switch 470-3). In such a case, the multiple switches 470 can be part of a single master switch or separate components. Further, one switch 470 can operate independently of, or in conjunction with, one or more of the other switches 470. In any case, each of the switches 470 is controlled by the controller 404. Specifically, there is a signal transfer link 405 that electrically couples the controller 404 to each switch 470.

Figure 5A:
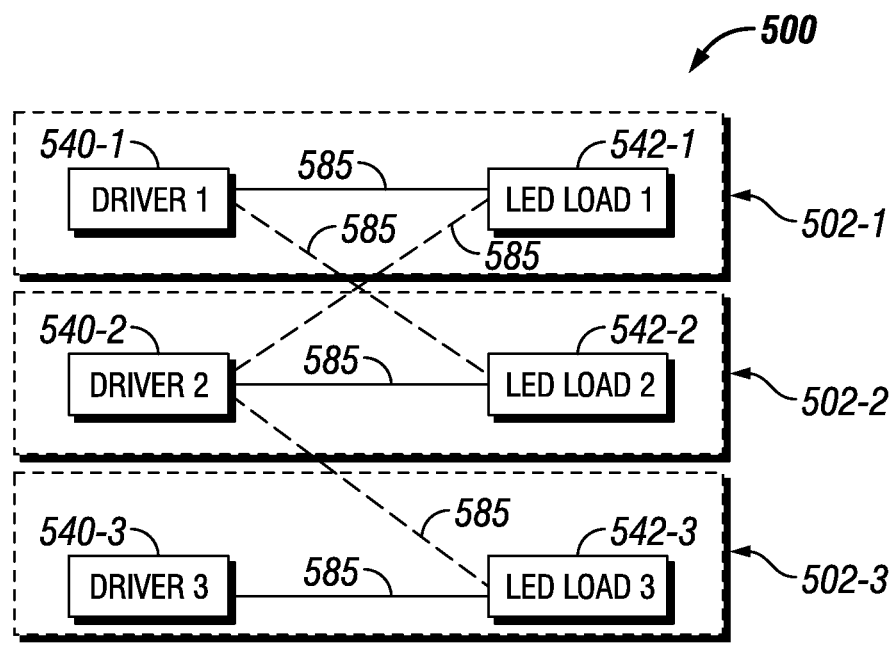
FIGS. 5A and 5B show a single line diagram and a schematic diagram, respectively, of a lighting system in accordance with certain example embodiments.
Figure 5B:
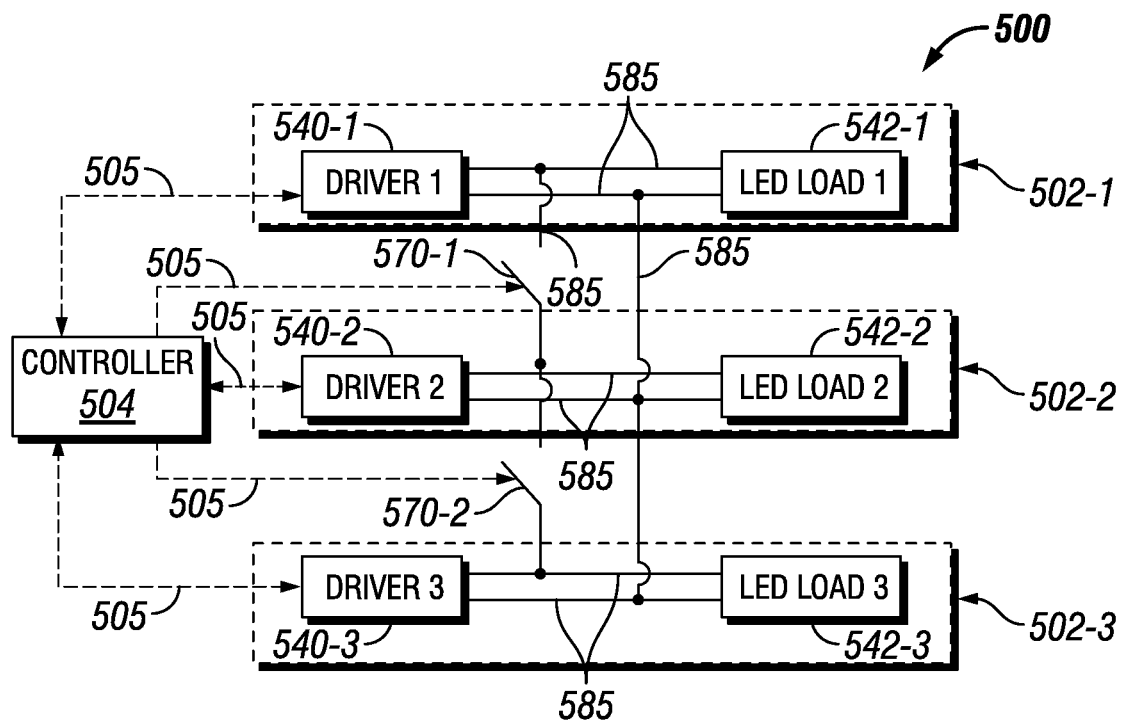

FIGS. 5A and 5B show a single line diagram and a schematic diagram, respectively, of a lighting system 500 in accordance with certain example embodiments. In this case, there are three different light fixtures 502 in the lighting system 500. Light fixture 502-1 includes one power supply 540-1 and one light load 542-1, with power transfer links 585 that electrically couple the two. Light fixture 502-2 includes one power supply 540-2 and one light load 542-2, with power transfer links 585 that electrically couple the two. Light fixture 502-3 includes one power supply 540-3 and one light load 542-3, with power transfer links 585 that electrically couple the two.

The lighting system 500 of FIGS. 5A and 5B also includes a controller 504 and two switches 570 (switch 570-1 and switch 570-2) that are separate from (e.g., multiple stand-alone devices, a single stand-alone device, part of another light fixture in the lighting system 500) light fixture 502-1, light fixture 502-2, and light fixture 502-3. Signal transfer links 505 electrically couple the controller 504 and the switches 570 to each other and to power supply 540-1 of light fixture 502-1, power supply 540-2 of light fixture 502-2, and power supply 540-3 of light fixture 502-3.

In this example, power supply 540-1, using power transfer links 585, is the primary source of power for light load 542-1 and the secondary source of power for light load 542-2; power supply 540-2, using power transfer links 585, is the primary source of power for light load 542-2 and the secondary source of power for light load 540-1 and light load 542-3; and power supply 540-3, using power transfer links 585, is the primary source of power for light load 542-3, but power supply 540-3 is not a secondary source of power for any of the other light loads.

Figure 6:
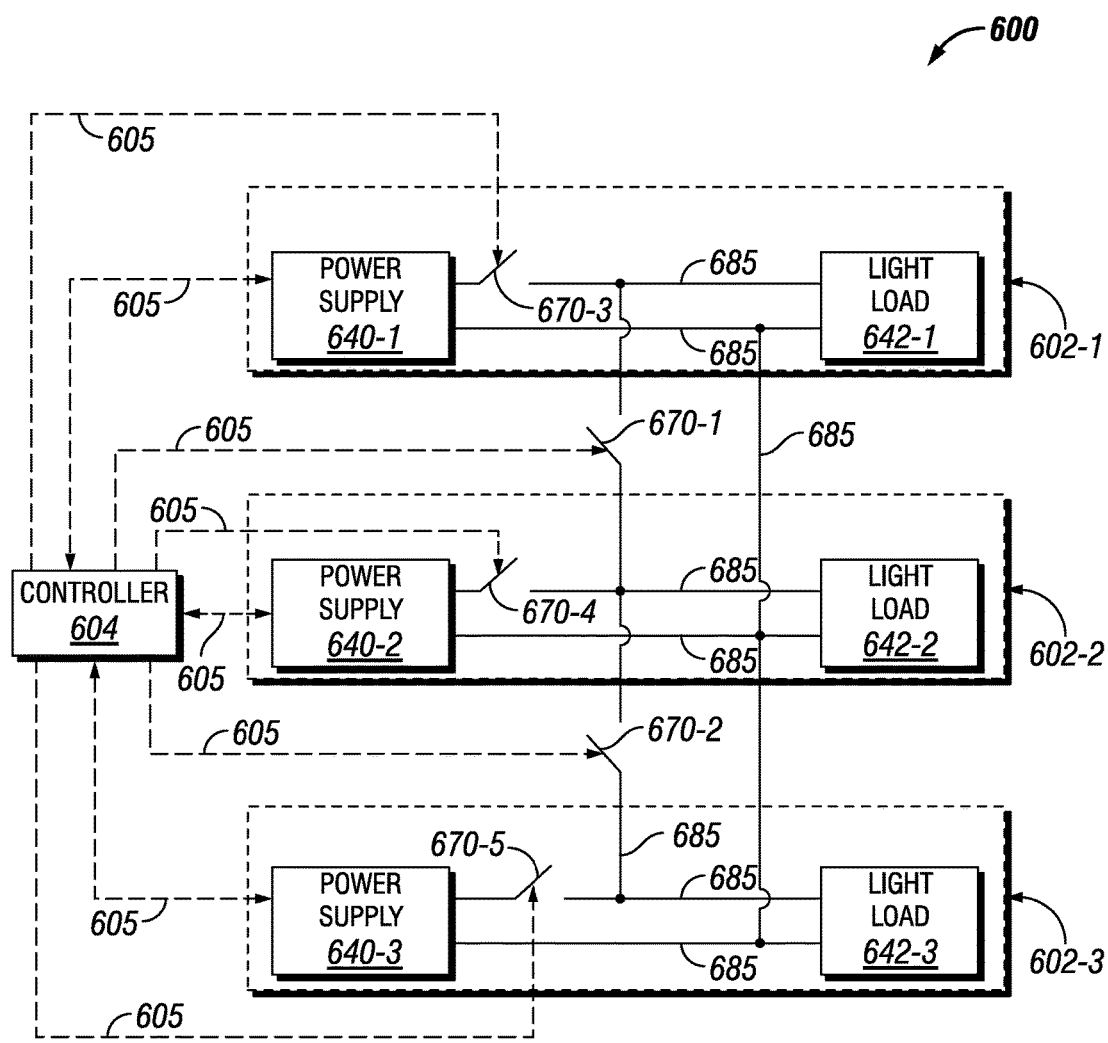
FIG. 6 shows a schematic diagram of another lighting system in accordance with certain example embodiments.

FIG. 6 shows a schematic diagram of another lighting system 600 in accordance with certain example embodiments. The lighting system 600 of FIG. 6 is substantially the same as the lighting system 500 of FIGS. 5A and 5B, except as described below. Specifically, instead of merely having two switches, the lighting system 600 of FIG. 6 includes five switches 670 (switch 670-1, switch 670-2, switch 670-3, switch 670-4, and switch 670-5). Switch 670-1 and switch 670-2 of FIG. 6 are substantially the same as, and serve substantially the same purpose as, switch 570-1 and switch 570-2 of FIGS. 5A and 5B.

Switch 670-3 opens the power transfer link 685 between power supply 640-1 and light load 642-1, removing power supply 640-1 as the source of power for light load 642-1. Switch 670-4 opens the power transfer link 685 between power supply 640-2 and light load 642-2, removing power supply 640-2 as the source of power for light load 642-2. Switch 670-5 opens the power transfer link 685 between power supply 640-3 and light load 642-3, removing power supply 640-3 as the source of power for light load 642-3. In this way, switch 670-3, switch 670-4, and switch 670-5 can be used to purposely isolate a power supply 640 when that power supply 640 is still operating properly (e.g., has not failed).

As an alternative embodiments, one or more switches 670 can be coupled to an input channel (as opposed to an output channel, as shown in the examples of FIG. 3A through FIG. 6, also denoted as FIGS. 3A-6) of a power source 640 as another way to isolate a power source 640, regardless of whether that power source 640 is operating properly at the time of isolation.

Figure 7A:
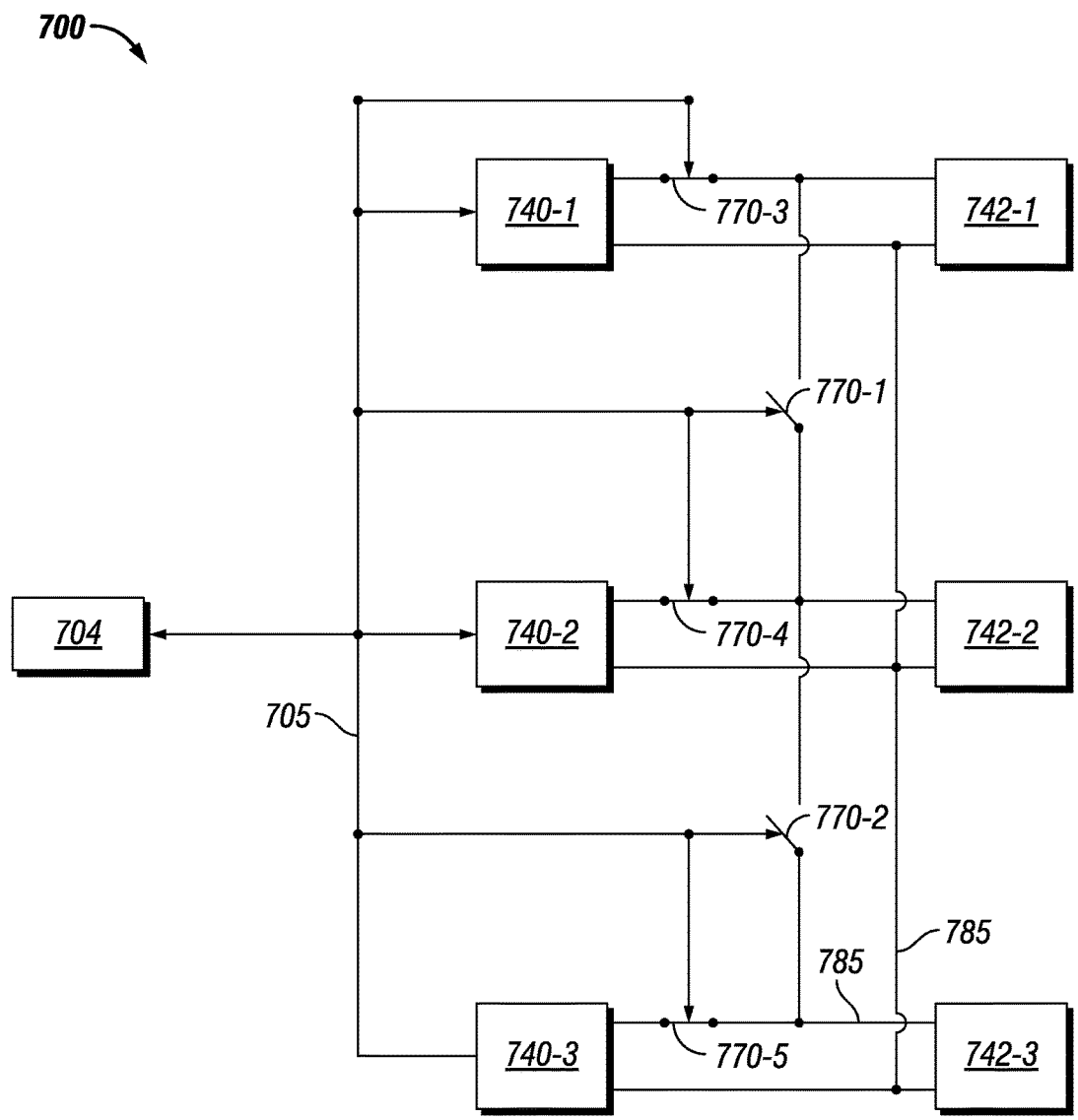
FIGS. 7A and 7B show an example of providing power to an electrical load using example embodiments.
Figure 7B:
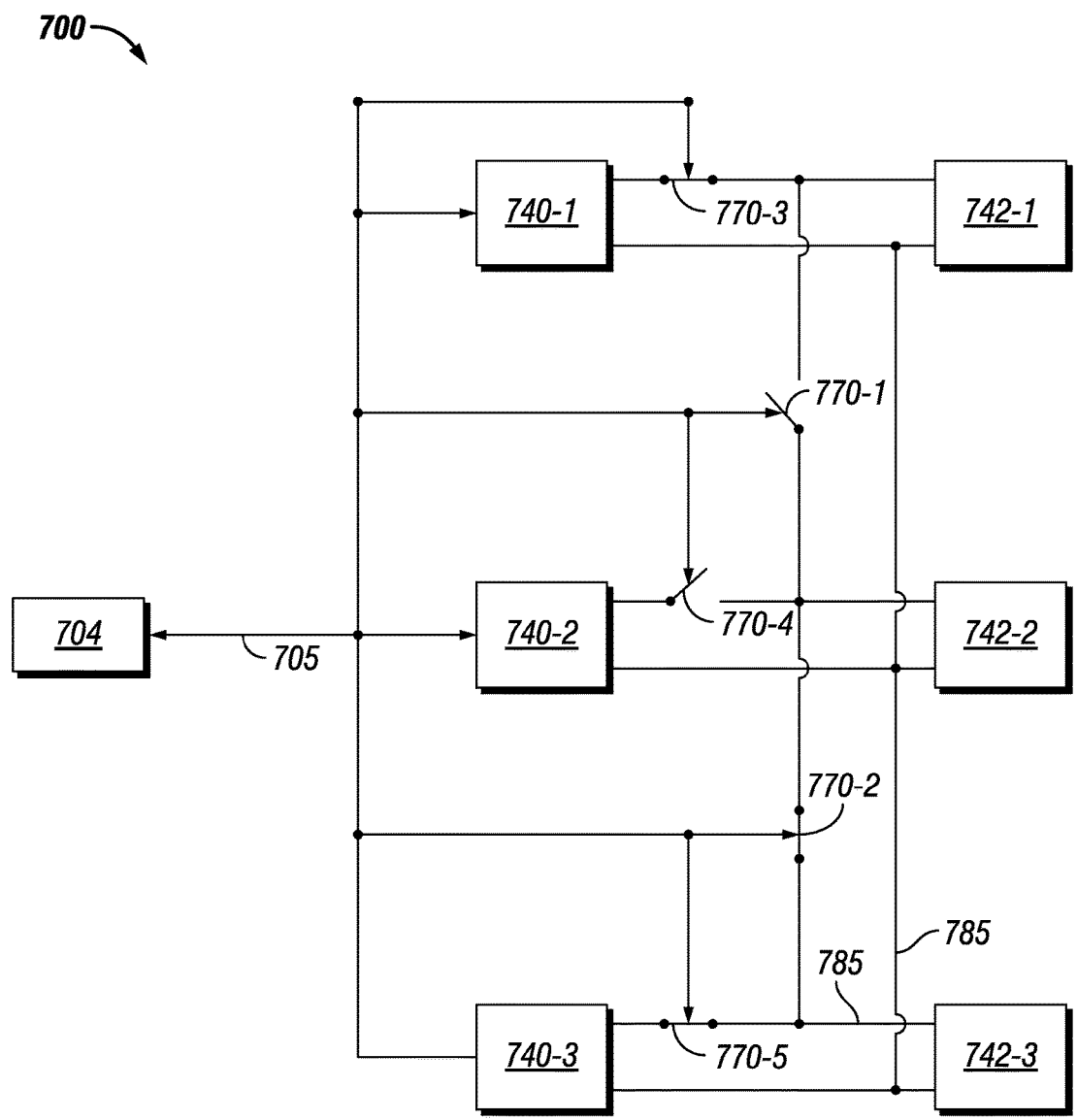

FIGS. 7A and 7B show an example of providing power to an electrical load using example embodiments. Referring to FIGS. 1A-7B, the system 700 of FIGS. 7A and 7B has a controller 704, five switches 770, three power sources 740, and three electrical loads 742. The controller 704 is communicably coupled to power supply 740-1, 740-2, 740-3, switch 770-1, switch 770-2, switch 770-3, switch 770-4, and switch 770-5 using a number of signal transfer links 705.

Switch 770-3 is disposed between power supply 740-1 and electrical load 742-1, switch 770-4 is disposed between power supply 740-2 and electrical load 742-2, and switch 770-5 is disposed between power supply 740-3 and electrical load 742-3. Switch 770-1 provides a link between power supply 740-2 and electrical load 742-1, as well as between power supply 740-1 and electrical load 742-2. Switch 770-2 provides a link between power supply 740-2 and electrical load 742-3, as well as between power supply 740-3 and electrical load 742-2. The switches 770, electrical loads 742, and power supplies 740 are electrically coupled to each other using a number of power transfer links 785.

Under normal conditions, as shown in FIG. 7A, switch 770-3, switch 770-4, and switch 770-5 are closed, while switch 770-1 and switch 770-2 are open. As a result, power supply 740-1 provides power to electrical load 742-1, power supply 740-2 provides power to electrical load 742-2, and power supply 740-3 provides power to electrical load 742-3. However, if the controller 704 determines that an adverse condition (e.g., a failure to operate, excessive temperature, too many consecutive operating hours) exists with one of the power supplies 740, the controller 704 can operate one or more of the switches 770 to isolate that power supply 740.

Such is the case in FIG. 7B, where the controller 704 determines that an adverse condition exists with power supply 740-2. As a result, the controller 704 operates switch 770-2 to change from an open state to a closed state, and the controller 704 also operates switch 770-4 to change from a closed state to an open state. The state of the other 3 switches 770 (switch 770-1, switch 770-3, and switch 770-5) remain unchanged relative to their state during the time period captured in FIG. 7A.

Once switch 770-2 and switch 770-4 change state based on instructions received from the controller 704, as shown in FIG. 7B, power supply 740-2 is electrically isolated from the rest of the system 700 by virtue of switch 770-4 being open. Further, since switch 770-2 is now closed, power supply 740-3 now provides power to both electrical load 742-2 and electrical load 742-3. Power supply 740-1 continues to provide power to electrical load 770-1.

As discussed previously, the controller 704 can adjust (in this case, increase) the output of the power supply 740-3 so that the demand for both electrical load 742-2 and electrical load 742-3 can be met. In some cases, this may involve reducing the power consumed by both electrical load 742-2 and/or electrical load 742-3. In certain example embodiments, the controller 704 can additionally be communicably coupled to (e.g., have the capability to monitor and/or control) one or more of the electrical loads 742. In this way, in addition to or in the alternative to adjusting the output of one or more power supplies 740, the controller 704 can adjust (e.g., increase, decrease) the demand of one or more of the electrical loads 742.

If power supply 740-2 is unavailable for an extended period of time, the controller 704 can, at some point in time after what is shown in FIG. 7B, operate one or more switches 770 to avoid overloading power supply 740-3. For example, relative to FIG. 7B, the controller 704 can close switch 770-1 and open switch 770-2, while keeping switch 770-3, switch 770-4, and switch 770-5 unchanged. In this way, power supply 740-3 would only provide power to electrical load 742-3, and power supply 740-1 would provide power to both electrical load 742-1 and electrical load 742-2.

Example embodiments can isolate one or more power supplies and/or provide a source of power to one or more light loads from an alternative power supply in a lighting system that has multiple power supplies. Example embodiments can be performed using a controller that operates one or more switches. Example embodiments can be performed during the failure of a power supply, to maintain a power supply, and/or to improve the performance and useful life of a power supply. Example embodiments can provide for more consistent and long-standing light output from each light load in a lighting system. As a result, example embodiments can be used to improve the safety in the various environments (e.g., industrial) in which a light fixture is disposed.

Example embodiments can also help ensure efficient allocation of maintenance resources within a facility. Example embodiments can further provide a user with options to prolong the useful life of a light fixture or components (e.g., power supplies) thereof.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical system, comprising:
   a first electrical load;
   a second electrical load;
   a first power supply coupled to the first electrical load, wherein the first electrical load receives a first power from the first power supply at a first time;
   a second power supply coupled to the second electrical load, wherein the second electrical load receives a second power from the second power supply at the first time; and
   a first switch disposed between and coupled to the first electrical load and the second power supply, wherein the first switch has an open position and a closed position,
   wherein the first switch, when in the open position at the first time, prevents the second power from being received by the first electrical load, and
   wherein the first switch, when in the closed position at a second time, allows the second power to be received by the first electrical load.

2. The electrical system of claim 1, further comprising:
   a second switch disposed between and coupled to the second electrical load and the first power supply, wherein the second switch has the open position and the closed position,
   wherein the second switch, when in the open position at the first time, prevents the first power from being received by the second electrical load, and
   wherein the second switch, when in the closed position at a third time, allows the first power to be received by the second electrical load.

3. The electrical system of claim 1, wherein the first electrical load, the second electrical load, the first power supply, the second power supply, and the first switch are disposed within an enclosure.

4. The electrical system of claim 1, wherein the first power supply and the second power supply are modules in a multi-module power supply.

5. The electrical system of claim 1, further comprising:
   a controller comprising an energy metering module, wherein the controller controls a state of the first switch between the open position and the closed position.

6. The electrical system of claim 5, wherein the controller moves the first switch to the closed position when the energy metering module detects a fault in the first power supply.

7. The electrical system of claim 6, wherein the controller further moves a second switch from the closed position to the open position when the energy metering module detects a fault in the first power supply, wherein the second switch, when in the open position, electrically isolates the first power supply from the first electrical load.

8. The electrical system of claim 5, wherein the controller comprises a hardware processor and a plurality of instructions stored in memory, wherein the plurality of instructions are executed on the hardware processor.

9. The electrical system of claim 1, further comprising:
   a second switch disposed between and coupled to the first electrical load and the first power supply, wherein the second switch has the open position and the closed position,
   wherein the second switch, when in the open position at the second time, prevents the first power from being received by the first electrical load,
   wherein the second switch, when in the closed position at the first time, allows the first power to be received by the first electrical load,
   wherein the second switch is in the closed position during normal operating conditions.

10. The electrical system of claim 1, wherein the first power supply and the first electrical load are part of a first light fixture, and wherein the second power supply and the second electrical load are part of a second light fixture.

11. The electrical system of claim 1, wherein the first power supply, the second power supply, the first electrical load, and the second electrical load are part of a light fixture, wherein the first electrical load comprises a first lighting load, and wherein the second electrical load comprises a second lighting load.

12. A switching system for an electrical system, the switching system comprising:
   a first switch electrically coupled to a first electrical load, a first power supply, and a second power supply of the electrical system, wherein the first switch has a first position and a second position; and
   a controller that operates the first switch between the first position and the second position,
   wherein the first switch, when in the first position, allows a first power to flow from the first power supply to the first electrical load and prevents a second power from flowing from the second power supply to the first electrical load, and
   wherein the first switch, when in the second position, allows the second power to flow from the second power supply to the first electrical load.

13. The switching system of claim 12, wherein the first switch, when in the second position, further prevents the first power from flowing from the first power supply to the first electrical load.

14. The switching system of claim 12, further comprising:
   a second switch electrically coupled to the first power supply, the second power supply, and a second electrical load, wherein the second switch has the first position and the second position,
   wherein the controller further operates the second switch between the first position and the second position,
   wherein the second switch, when in the first position, allows the second power to flow from the second power supply to the second electrical load and prevents the first power from flowing from the first power supply to the second electrical load, and
   wherein the second switch, when in the second position, allows the first power to flow from the first power supply to the second electrical load.

15. The switching system of claim 14, wherein the second switch, when in the second position, further prevents the second power from flowing from the second power supply to the second electrical load.

16. The switching system of claim 14, further comprising:
a third switch electrically coupled to the second power supply, a third power supply, and a third electrical load, wherein the third switch has the first position and the second position,
wherein the controller further operates the third switch between the first position and the second position,
wherein the third switch, when in the first position, allows third power to flow from the third power supply to the third electrical load and prevents the second power from flowing from the second power supply to the third electrical load, and
wherein the third switch, when in the second position, allows the second power to flow from the second power supply to the third electrical load.

17. The switching system of claim 14, wherein the first switch is in the first position at a first time and in the second position at a second time.

18. The switching system of claim 14, wherein the first switch is further electrically coupled to a third power supply, wherein the first switch further has a third position, wherein the first switch, when in the third position, allows third power to flow from the third power supply to the first electrical load and prevents the first power and the second power from flowing to the first electrical load, and wherein the first switch, when in the first position and the second position, prevents the third power from flowing from the third power supply to the first electrical load.

19. The switching system of claim 14, further comprising:
an energy metering module operatively coupled to the controller,
wherein the controller operates the first switch based on measurements made by the energy metering module.

20. A method for providing power to a lighting system, the method comprising:
operating, using a controller at a first time, a switch to a first position, wherein the switch is electrically coupled to a first power supply, a second power supply, and a first lighting load, wherein first power from the first power supply flows to the first lighting load when the switch is in the first position, and wherein second power from the second power supply is prevented from flowing to the first lighting load when the switch is in the first position; and
operating, using the controller at a second time, the switch to a second position, wherein the first power from the first power supply is prevented from flowing to the first lighting load when the switch is in the second position, and wherein the second power from the second power supply flows to the first lighting load when the switch is in the second position.

* * * * *